(12) United States Patent
Yumiba et al.

(10) Patent No.: US 7,136,335 B2
(45) Date of Patent: Nov. 14, 2006

(54) INFORMATION RECORDING MEDIUM, RECORDING APPARATUS, AND REPRODUCTION APPARATUS

(75) Inventors: Takashi Yumiba, Kyoto (JP); Masaru Yamaoka, Osaka (JP); Takahiro Nagai, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 640 days.

(21) Appl. No.: 10/408,746

(22) Filed: Apr. 7, 2003

(65) Prior Publication Data

US 2003/0189884 A1 Oct. 9, 2003

(30) Foreign Application Priority Data

Apr. 9, 2002 (JP) ............................. 2002-106170

(51) Int. Cl.
  *G11B 7/00* (2006.01)
(52) U.S. Cl. ............................... 369/47.28; 369/59.12; 369/47.35; 369/59.17; 369/59.27
(58) Field of Classification Search ............ 369/47.28, 369/59.12, 47.35, 59.17, 59.27
  See application file for complete search history.

(56) References Cited

U.S. PATENT DOCUMENTS

| 5,027,228 A * | 6/1991 | Yokoyama | 360/15 |
| 5,533,003 A | 7/1996 | Kobayashi | 369/275.4 |
| 6,219,322 B1 * | 4/2001 | Kobayashi | 369/59.11 |
| 6,545,965 B1 * | 4/2003 | Hayashi | 369/59.12 |
| 6,735,160 B1 * | 5/2004 | Miyashita et al. | 369/59.12 |
| 2003/0185128 A1 * | 10/2003 | Shoji et al. | 369/59.25 |
| 2004/0246866 A1 * | 12/2004 | Sato et al. | 369/59.25 |

FOREIGN PATENT DOCUMENTS

| EP | 0 866 454 A2 | 9/1998 |
| JP | 11-126426 | 11/1999 |
| JP | 2002-324362 | 11/2002 |
| WO | 02/25645 A2 | 3/2002 |
| WO | 02/35529 A2 | 5/2002 |
| WO | 02/067255 A1 | 8/2002 |

OTHER PUBLICATIONS

European Search Report, Application No. EP 03 00 7479, dated Jun. 27, 2003.

* cited by examiner

*Primary Examiner*—Wayne Young
*Assistant Examiner*—Minerva Rivero
(74) *Attorney, Agent, or Firm*—Renner, Otto, Boisselle & Sklar, LLP

(57) ABSTRACT

An information recording medium for recording main information and auxiliary information is provided. The auxiliary information is recorded on the information recording medium in a manner that edge positions of the pits or the recording marks indicating the main information are shifted either in a phase advancing direction or in a phase delaying direction along the track direction. A predetermined frequency is used to determine whether the edge position is shifted in the phase advancing direction or in the phase delaying direction in order to record the auxiliary information. The predetermined frequency is substantially consistently lower than ½ of a reference frequency of a recording clock for creating the pits or the recording marks and is higher than a response frequency of a PLL for generating a reproduction clock for reproducing the main information.

7 Claims, 9 Drawing Sheets

INFORMATION RECORDING MEDIUM, RECORDING APPARATUS, AND REPRODUCTION APPARATUS

BACKGROUND OF THE INVENTION

1. Field of the Invention

The present invention relates to an information recording medium, a recording apparatus for recording information onto the information recording medium, and a reproduction apparatus for reproducing information from the information recording medium. More particularly, the present invention relates to a technique for recording main information together with auxiliary information.

2. Description of the Related Art

Optical discs represented by DVD (Digital Versatile/Video Disc) are widely used as media for storing a large volume of digital data, such as AV (Audio Video) data, computer data, or the like. For example, reproduction-only optical discs, in which a high-quality motion picture of two hours or more is recorded, are currently on the market. In order to protect unauthorized duplication of such copyrighted digital contents onto other recording media, a technique called "contents encryption" has been introduced. (Nikkei Electronics, Nov. 18, 1996, P. 13–14).

In this technique, compressed digital contents, such as movies, are encrypted using three-layered private keys (a title key, a disc key, and a master key) and then is stored in a user information region accessible for the user. The master key, which is the most important of the private keys, is provided only to licensed, authorized manufacturers. The disc key and the title key, which are required for each DVD and each title, respectively, are encrypted based on the master key and are stored in a control information region which cannot be accessed by the user. In this case, the user cannot access the private keys which are required for decryption, resulting in prevention of unauthorized duplication by a file copying operation or the like. Such a protection technique has the following drawback. If the contents in the entire recording region including the control information region storing the private keys are unauthorizedly duplicated onto other discs, the encrypted contents can be decrypted and reproduced by an authorized reproduction apparatus from these optical discs.

To solve the above-described problem, Japanese Laid-Open Publication No. 11-126426 discloses the following technique. Normal main information is recorded by changing the length or space between pits or recording marks formed on a track so that a resulting reproduction signal varies in a cycle which is an integral multiple of a predetermined fundamental cycle. Auxiliary information, such as an identifier for identifying an optical information recording medium, or the like, is recorded by displacing the pits or marks slightly back and forth from their normal positions.

The above-described conventional example will be described with reference to FIG. 7. FIG. 7 shows a conventional optical information recording apparatus 501. As shown in FIG. 7, the optical information recording apparatus 501 records digital information onto an optical information recording medium 502 by modulating recording light L to be applied to the optical information recording medium 502. The optical information recording apparatus 501 comprises a modulation circuit 504, a disc identifier generation circuit 505, a second modulation circuit 506, an optical modulator 507, a spindle servo 508, and a recording laser 509.

The modulation circuit 504 generates a first modulated signal S2 by switching the signal levels of first digital information D1 from a digital audio tape recorder 503 in a cycle which is an integral multiple of a fundamental cycle.

The second modulation circuit 506 generates a double modulated signal SC by modulating the timing of a change in the level of the first modulated signal S2 in accordance with a second digital information SC1 (in this conventional example, a disc identifier which is output by the disc identifier generation circuit 505) other than the first digital information D1. The optical modulator 507 modulates the recording light L in accordance with the double modulated signal SC.

FIG. 8 shows the second modulation circuit 506. FIG. 9 shows timing charts of elements in the second modulation circuit 506. Referring to FIG. 8, an EFM signal S2 which has been input to the second modulation circuit 506 is input to monostable multivibrators 510A and 510B. The monostable multivibrators 510A and 510B detect the rising edge and falling edge of the EFM signal S2 and then outputs a rising edge detection pulse MMS and a falling edge detection pulse MMR (FIG. 9). A data selector 511A receives the rising edge detection pulse MMS and a signal obtained by delaying the rising edge detection pulse MMS using a delay circuit 512A. A data selector 511B receives the falling edge detection pulse MMR and a signal obtained by delaying the falling edge detection pulse MMR using a delay circuit 512B. A disc identification information SC1 is initialized by a frame clock FCK. An M sequence code MS is generated based on a channel clock CK generated by a PLL 513. A control signal MS1 is generated by the exclusive OR operation of the initialized disc identification information SC1 and the M sequence code MS. The data selectors 511A and 511B receive the control signal MS1 and the inverted control signal MS1, respectively, via their respective selection input terminal.

When the control signal MS1 indicates "H", the data selector 511A selects the rising edge detection pulse MMS delayed by the delay circuit 512A and outputs it as a rising edge pulse SS. When the control signal MS1 indicates "L", the data selector 511A selects the non-delayed rising edge detection pulse MMS and outputs it as a rising edge pulse SS. When the control signal MS1 indicates "L", the data selector 511B selects the falling edge detection pulse MMR delayed by the delay circuit 512B and outputs it as a falling edge pulse RR. When the control signal MS1 indicates "H", the data selector 511B selects the non-delayed falling edge detection pulse MMR and outputs it as a falling edge pulse RR.

These rising edge pulse SS and the falling edge pulse RR are reconstructed into an EFM signal by a set/reset flip flop 514. As a result, the edge of the EFM signal is partially delayed. According to such a recording technique, even if the contents in the entire recording region are unauthrizedly duplicated bit by bit onto other optical discs, disc identification information which is encoded by the edge of the recording mark cannot be duplicated. Therefore, for example, when an attempt is made to reproduce information from such a duplicated disc, disc identification information cannot be detected and reproduced and the reproduction operation can be arrested.

However, such a conventional technique has the following drawback. Bit shift may occur due to dust or scars on a disc in detecting auxiliary information encoded together with main information. In this case, the edge of the EFM signal established in recording may not be correctly associated with the corresponding level of the control signal, i.e., the delay of the EFM signal may not be correctly detected. In this case, whereas the first digital information D1 can be

SUMMARY OF THE INVENTION

According to an aspect of the present invention, an information recording medium for recording main information and auxiliary information is provided. The information recording medium comprises a track. The main information is recorded on the information recording medium in a manner that pits or recording marks indicating the main information are provided on the information recording medium in a track direction. The auxiliary information is recorded on the information recording medium in a manner that edge positions of the pits or the recording marks are shifted either in a phase advancing direction or in a phase delaying direction along the track direction. A predetermined frequency is used to determine whether the edge position is shifted in the phase advancing direction or in the phase delaying direction in order to record the auxiliary information. The predetermined frequency is substantially consistently lower than ½ of a reference frequency of a recording clock for creating the pits or the recording marks and is higher than a response frequency of a PLL for generating a reproduction clock for reproducing the main information.

In one embodiment of this invention, the predetermined frequency may be determined based on a result of a first logic operation of a predetermined binary sequence and the auxiliary information. The frequency of the predetermined binary sequence may be lower than ½ of the reference frequency of the recording clock and is higher than the response frequency of the PLL.

In one embodiment of this invention, the predetermined binary sequence may be a pseudo-random number sequence comprising a plurality of elements. The predetermined frequency may be determined based on a result of a second logic operation of a PE modulated signal and the result of the first logic operation. The PE modulated signal may be logically inverted at the middle of each of the plurality of elements. The frequency of the PE modulated signal may be lower than ½ of the reference frequency of the recording clock and is higher than the response frequency of the PLL.

According to another aspect of the present invention, a recording apparatus for recording main information and auxiliary information onto an information recording medium having a track is provided. The apparatus comprises a recording signal generation section for generating a recording signal indicating the main information synchronized with a recording clock, a phase modulation section for modulating an edge position of the recording signal either in a phase advancing direction of the recording signal or in a phase delaying direction of the recording signal to generate a phase modulation recording signal indicating the main information and the auxiliary information, and a recording section for creating pits or recording marks indicating the main information onto the information recording medium in a manner that edge positions of the pits or the recording marks are shifted either in a phase advancing direction or in a phase delaying direction along a track direction based on the phase modulation recording signal, whereby the main information and the auxiliary information are recorded on the information recording medium. The phase modulation section uses a predetermined frequency to determine whether the edge position of the recording signal is shifted in the phase advancing direction of the recording signal or in the phase delaying direction of the recording signal. The predetermined frequency is substantially consistently lower than ½ of a reference frequency of a recording clock for creating the pits or the recording marks and is higher than a response frequency of a PLL for generating a reproduction clock for reproducing the main information.

In one embodiment of this invention, the recording apparatus may further comprise a binary sequence generation section for generating a predetermined binary sequence, an auxiliary information output section for outputting the auxiliary information, and a logic operation section for performing a first logic operation of the predetermined binary sequence and the auxiliary information, and based on a result of the first logic operation, producing a control signal indicating the predetermined frequency. The phase modulation section may use the predetermined frequency indicated by the control signal to determine whether the edge position of the recording signal is modulated in the phase advancing direction of the recording signal or in the phase delaying direction of the recording signal. The frequency of the predetermined binary sequence may be lower than ½ of the reference frequency of the recording clock and is higher than the response frequency of the PLL.

In one embodiment of this invention, the predetermined binary sequence may be a pseudo-random number sequence comprising a plurality of elements. The recording apparatus may further comprise a PE modulation signal generation section for generating a PE modulated signal logically inverted at the middle of each of the plurality of elements. The logic operation section may perform a second logical operation of the PE modulation signal and the result of the first logical operation, and based on a result of the second logical operation, may produce the control signal. The frequency of the PE modulated signal may be lower than ½ of the reference frequency of the recording clock and is higher than the response frequency of the PLL.

According to another aspect of the present invention, a reproduction apparatus for reproducing main information and auxiliary information recorded on an information recording medium is provided. The information recording medium comprises a track. The main information is recorded on the information recording medium in a manner that pits or recording marks indicating the main information are provided on the information recording medium in a track direction. The auxiliary information is recorded on the information recording medium in a manner that edge positions of the pits or the recording marks are shifted either in a phase advancing direction or in a phase delaying direction along the track direction. The reproduction apparatus comprises a read section for reading the pits or the recording marks and producing a read signal, a PLL for generating a reproduction clock synchronized with the read signal, a phase comparison section for comparing the phase of the read signal with the phase of the reproduction clock and producing an advanced phase signal indicating the advance of the phase of the read signal when the phase of the read signal is advanced from the phase of the reproduction clock or a delayed phase signal indicating the delay of the phase of the read signal when the phase of the read signal is delayed from the phase of the reproduction clock, an auxiliary information detection section for integrating the advanced phase signal and the delayed phase signal in accordance with a predetermined frequency, and based on a result of the integration, detecting the auxiliary information, and a demodulation section for demodulating the read signal so as to detect the main information. The predetermined frequency is substantially consistently lower than ½ of a reference frequency of a recording clock for creating the pits or the recording marks and is higher than the response frequency of the PLL.

In one embodiment of this invention, the auxiliary information detection section may detect a value of the auxiliary information by comparing a result of the integration with a predetermined positive threshold and a predetermined negative threshold.

In one embodiment of this invention, the auxiliary information detection section may detect the presence or absence of the auxiliary information by comparing a result of the integration with a predetermined positive threshold and a predetermined negative threshold.

In one embodiment of this invention, the reproduction apparatus may further comprise a pseudo-random number sequence generation section for generating a pseudo-random number sequence comprising a plurality of elements, a PE modulated signal generation section for generating a PE modulated signal logically inverted at the middle of each of the plurality of element, and a logic operation section for performing a logic operation of the pseudo-random number sequence and the PE modulated signal, and based on a result of the logic operation, producing a control signal indicating the predetermined frequency. The auxiliary information detection section may integrate the advanced phase signal and the delayed phase signal in accordance with the predetermined frequency indicated by the control signal. The frequency of the pseudo-random number sequence and the frequency of the PE modulated signal are lower than ½ of the reference frequency of the recording clock and are higher than the response frequency of the PLL.

Thus, the invention described herein makes possible the advantages of providing an information recording medium with which all contents recorded therein including copyrighted digital contents are prevented from being unauthorizedly duplicated without change, existing reproduction apparatuses are not substantially affected, and auxiliary information can be stably reproduced even from a disc having dust or scars thereon; a recording apparatus for recording information onto the information recording medium; and a reproduction apparatus for reproducing information from the information recording medium.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described in detail by way of examples.

Figure 1:
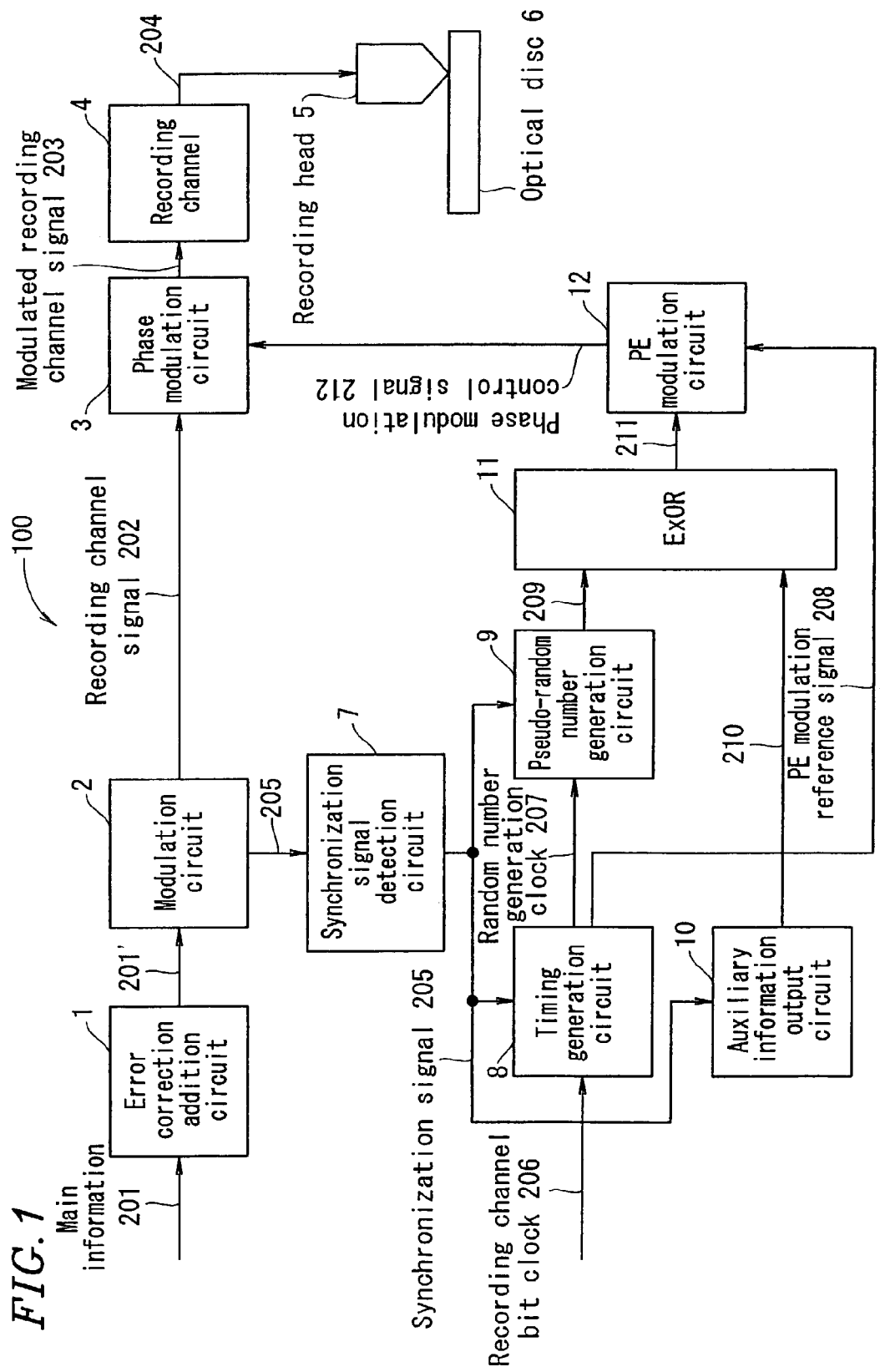
FIG. 1 is a diagram showing an optical disc recording apparatus according to an embodiment of the present invention.
Figure 5:
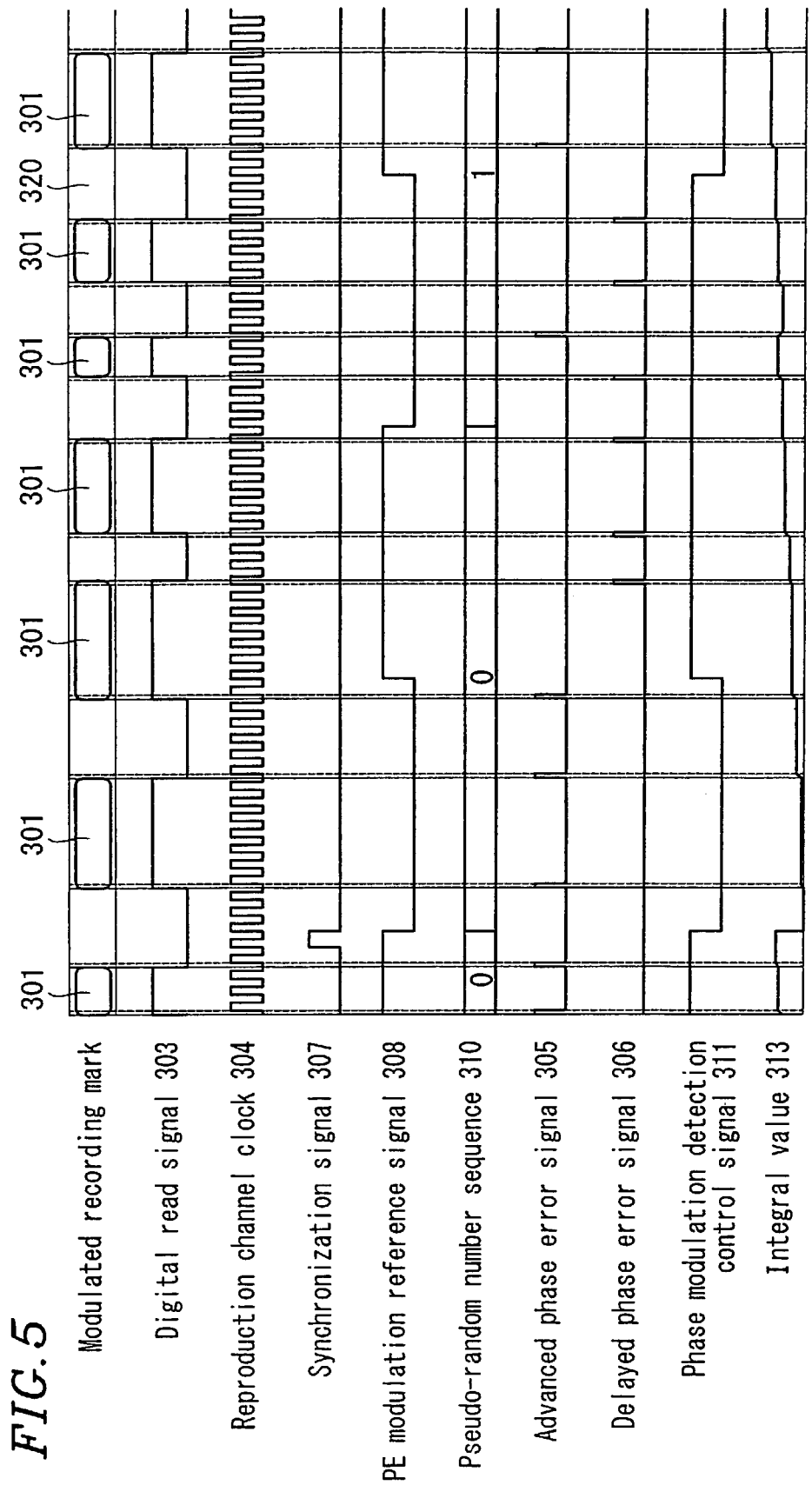
FIG. 5 is a timing chart of operations of elements in an optical disc reproduction apparatus according to an embodiment of the present invention.

FIG. 1 shows an optical disc recording apparatus 100 according to an embodiment of the present invention. The optical disc recording apparatus 100 comprises an error correction addition circuit 1, a modulation circuit 2, a phase modulation circuit 3, a recording channel 4, a recording head 5, a synchronization signal detection circuit 7, a timing generation circuit 8, pseudo-random number generation circuit 9, an auxiliary information output circuit 10, a logic operation circuit 11, and a PE (Phase Encoding) modulation circuit 12. An optical disc 6 (information recording medium) is loaded in the optical disc recording apparatus 100. The optical disc 6 has a track 320 (FIG. 5).

The error correction addition circuit 1 calculates error correction codes for main information 201 input via an external apparatus or the like (not shown) and adds the error correction codes to the main information 201. The modulation circuit 2 functions as a recording signal generation section for generating a recording channel signal 202 indicating the main information 201 synchronized with a recording channel bit clock 206. The modulation circuit 2 modulates the main information 201' with the error correction codes and subjects the modulated code to NRZi transformation to output the recording channel signal 202. The recording channel signal 202 indicates the main information 201.

The phase modulation circuit 3 phase-modulates the recording channel signal 202 generated by the modulation circuit 2 in accordance with a phase modulation control signal 212. The phase modulation circuit 3 slightly advances or delays the phase of the rising edge and the falling edge of the input recording channel signal 202 in accordance with the polarity of the phase modulation control signal 212. The phase-modulated recording channel signal 202 output by the phase modulation circuit 3 is referred to as a modulated recording channel signal 203. The modulated recording channel signal 203 contains the main information 201 and auxiliary information 210.

The recording channel 4 and the recording head 5 function as a recording section for recording the main information 201 and the auxiliary information 210 onto the optical disc 6. The recording channel 4 and the recording head 5 form pits or recording marks indicating the main information 201 in a track direction on the optical disc 6, where the pits or recording marks are shifted in a direction which causes the phase of the main information 201 to be either advanced or delayed, in accordance with the modulated recording channel signal 203. Thereby, the main information 201 and the auxiliary information 210 are recorded onto the optical disc 6. The recording channel 4 generates a control signal 204 used for changing the recording power of a laser beam to be applied to the optical disc 6 in accordance with the polarity of the modulated recording channel signal 203, and outputs the control signal 204 to the recording head 5. The recording head 5 forms optically readable modulated pits or recording marks onto the optical disc 6 while changing the power of a laser beam in accordance with the control signal 204 from the recording channel 4.

The synchronization signal detection circuit 7 detects a synchronization signal 205 which has been added to the main information 201 by the modulation circuit 2. The timing generation circuit 8 functions as a PE modulation reference signal generation section. The timing generation circuit 8 receives the recording channel bit clock 206 synchronized with the recording channel signal 202 from an external apparatus or the like (not shown) and generates a random number generation clock 207 and a PE modulation reference signal 208. The random number generation clock 207 indicates the timing of generation of a sequence of pseudo-random numbers (binary sequence) which will be generated by the pseudo-random number generation circuit (binary sequence generation section) 9.

Figure 2:
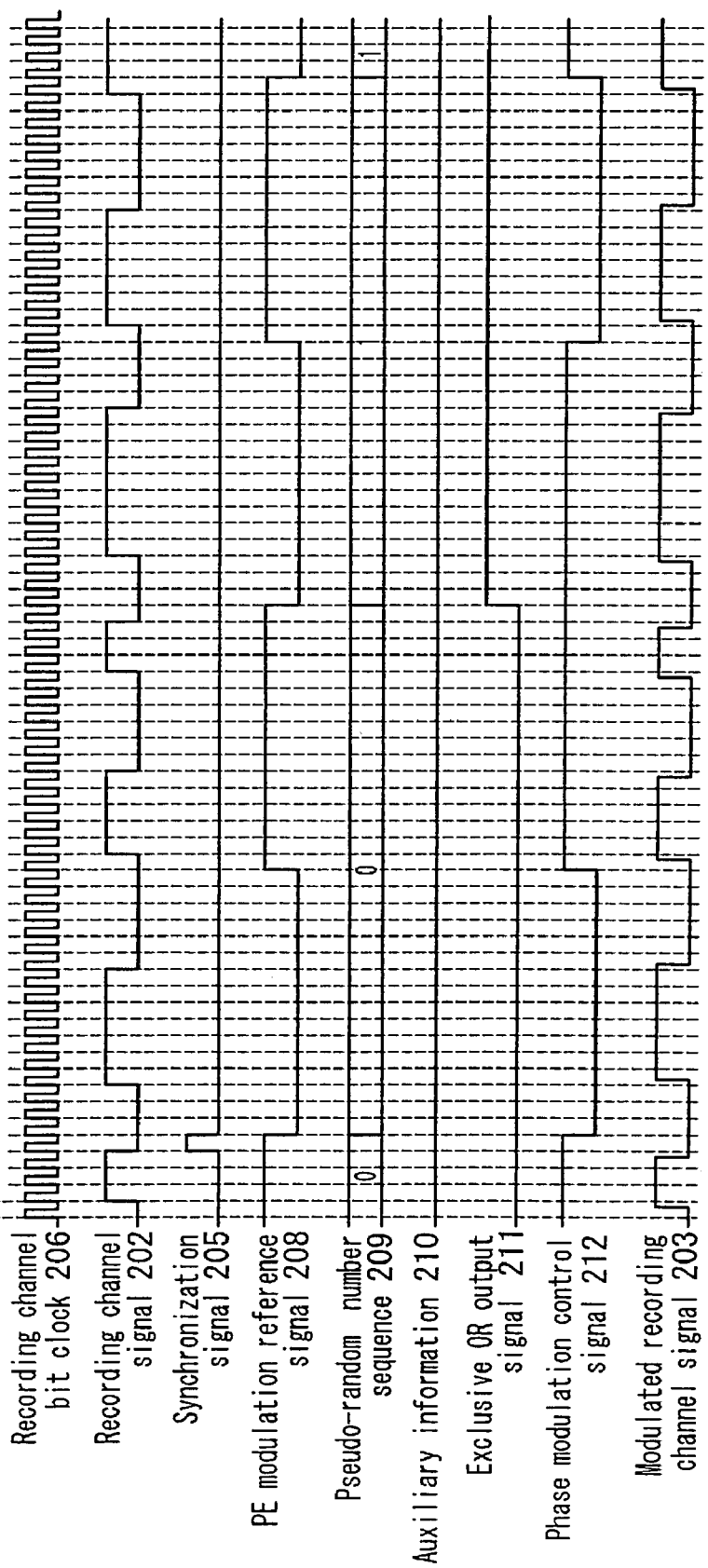
FIG. 2 is a timing chart of operations of elements in an optical disc recording apparatus according to an embodiment of the present invention.

Note that in this embodiment, the timing generation circuit 8 generates the PE modulation reference signal 208 which alternately goes to "Low" or "High" in a cycle of 16 recording channel bit clocks 206 using the synchronization signal 205 as a reference. The random number generation clock 207 is an inverted signal of the PE modulation reference signal 208. The pseudo-random number generation circuit 9 updates the pseudo-random number sequence 209 every time it encounters the rising edge of the random number generation clock 207. The frequency of the pseudo-random number sequence 209 (i.e., the frequency of the random number generation clock 207 used as a reference in generating the pseudo-random number sequence 209) is lower than ½ of the reference frequency of the recording channel bit clock 206 and is higher than the response frequency of a PLL (Phase-Locked Loop) 45 (FIG. 3) which generates a reproduction channel clock 304 (FIG. 5) for reproducing the main information 201. As shown in FIG. 2, in this embodiment, one cycle of the reference frequency of the recording channel bit clock 206 is one clock. In this embodiment, one cycle of at least one of the random number generation clock 207 and the PE modulation reference signal 208 is 32 clocks.

The auxiliary information output circuit 10 stores the auxiliary information 210 (e.g., disc identification information, a private key which is used in encrypting and recording digital contents onto the optical disc 6, and the like). The auxiliary information output circuit 10 outputs the auxiliary information 210 bit by bit in accordance with the synchronization signal 205. Note that in this embodiment, the auxiliary information 210 is generated within the optical disc recording apparatus 100, although the auxiliary information 210 may be input from an external apparatus (not shown), or alternatively, the auxiliary information 210 may be extracted from the contents of the main information 201.

The logic operation circuit 11 and the PE modulation circuit 12 function as a logic operation section. The logic operation circuit 11 performs an exclusive OR operation of the pseudo-random number sequence 209 output by the pseudo-random number generation circuit 9 and the auxiliary information 210 output by the auxiliary information output circuit 10. The PE modulation circuit 12 PE-modulates an exclusive OR output signal 211 output by the logic operation circuit 11 using the PE modulation reference signal 208. The exclusive OR output signal 211 indicates the result of the operation in the logic operation circuit 11. Specifically, the PE modulation circuit 12 performs an exclusive OR operation of the exclusive OR output signal 211 and the PE modulation reference signal 208. As a result, the PE modulation circuit 12 generates the phase modulation control signal 212 whose polarity is inverted at the middle of each element included in the exclusive OR output signal 211. The PE modulation circuit 12 outputs "01" when the exclusive OR output signal 211 indicates "1" and "10" when the exclusive OR output signal 211 indicates "0".

In this embodiment, the exclusive OR output signal 211 is a pseudo-random number sequence which is updated every 32 recording channel bit clocks 206. Therefore, the polarity of the phase modulation control signal 212 is inverted at the middle of the 1-bit pseudo-random number sequence 209 (i.e., every 16 recording channel bit clocks 206).

The phase modulation circuit 3 receives the phase modulation control signal 212. The phase modulation circuit 3 determines whether the edge position of the recording channel signal 202 is modulated in a manner that allows the phase of the recording channel signal 202 to be advanced or delayed, based on the frequency of the phase modulation control signal 212. The frequency of the phase modulation control signal 212 is substantially consistently lower than ½ of the reference frequency of the recording channel bit clock 206 and is higher than the response frequency of the PLL 45 (FIG. 3) which generates the reproduction channel clock 304 (FIG. 5) for reproducing the main information 201. As used herein, "substantially consistently lower" indicates that the phase modulation control signal 212 may contain a slight amount of frequencies greater than or equal to ½ of the reference frequency and such a noise is within tolerance. The phase modulation circuit 3 either advances or delays the phase of each edge of the recording channel signal 202 in accordance with the polarity of the phase modulation control signal 212 at the respective edge of the recording channel signal 202. Specifically, when the phase modulation control signal 212 indicates "1", the phase of the edge of the recording channel signal 202 is advanced. When the phase modulation control signal 212 indicates "0", the phase of the edge of the recording channel signal 202 is delayed. The phase-modulated recording channel signal 203 is transferred via the recording channel 4 to the recording head 5 which then performs control of laser emission for formation of recording marks on the optical disc 6.

FIG. 2 shows a timing chart of elements in the optical disc recording apparatus 100. An operation of the optical disc recording apparatus 100 will be described in more detail with reference to FIG. 2. The error correction addition circuit 1 adds error correction codes to the main information 201 and outputs the main information 201'. The modulation circuit 2 modulates the main information 201' and adds a synchronization signal to the main information 201'. After the modulated main information 201' is subjected to NRZi transformation, the modulated main information 201' is output as the recording channel signal 202 to the phase modulation circuit 3.

The synchronization signal 205 added by the modulation circuit 2 is detected and output by the synchronization signal detection circuit 7. The timing generation circuit 8 generates the PE modulation reference signal 208 and the random number generation clock 207 which is an inverted signal of the PE modulation reference signal 208 based on the recording channel bit clock 206 synchronized with the recording channel signal 202 with reference to the synchronization signal 205. Specifically, as shown in FIG. 2, the PE modulation reference signal 208 is generated by the timing generation circuit 8 with reference to the synchronization signal 205 so that the PE modulation reference signal 208 alternately goes to "0" or "1" in a cycle of 16 clocks. The random number generation clock 207 is an inverted signal of the PE modulation reference signal 208. The pseudo-random number generation circuit 9 updates the pseudo-random number sequence 209 every time it encounters the rising edge of the random number generation clock 207 (i.e., the falling edge of the PE modulation reference signal 208).

The pseudo-random number sequence 209 includes a plurality of elements. In this embodiment, one of the elements included in the pseudo-random number sequence 209 indicates a set of pseudo-random numbers indicating "0" or "1" contained in a certain period (32-clock period in FIG. 2). The logic of the PE modulation reference signal 208 is inverted at the middle of each of the elements contained in the pseudo-random number sequence 209. The frequency of the PE modulation reference signal 208 is lower than ½ of the reference frequency of the recording channel bit clock 206 is higher than the response frequency of the PLL 45 (FIG. 3) which generates the reproduction channel clock 304 (FIG. 5) for reproducing the main information 201.

The synchronization signal 205 is input to the pseudo-random number generation circuit 9 and the auxiliary information output circuit 10. In the pseudo-random number generation circuit 9, the operation of the pseudo-random number generation circuit 10 is initialized at the timing indicated by the synchronization signal 205, and the pseudo-random number sequence 209 is sequentially generated at the timing indicated by the random number generation clock 207. The auxiliary information output circuit 10 outputs the auxiliary information 210, such as disc identification information, a private key, and the like, which is stored in the auxiliary information output circuit 10, bit by bit in response to the synchronization signal 205.

The exclusive OR circuit 11 performs an exclusive OR operation of the pseudo-random number sequence 209 and the auxiliary information 210 and outputs the exclusive OR output signal 211 to the PE modulation circuit 12. The PE modulation circuit 12 performs an exclusive OR operation of the exclusive OR output signal 211 and the PE modulation reference signal 208, and based on the result of the operation, generates the phase modulation control signal 212. In this embodiment, when the polarity of the exclusive OR output signal 211 is "0", the phase modulation control signal 212 indicates "0" in the first half 16 clocks of 32 clocks and "1" in the second half 16 clocks. When the polarity of the exclusive OR output signal 211 is "1", the phase modulation control signal 212 indicates "1" in the first half 16 clocks and "0" in the second half 16 clocks.

The phase modulation control signal 212 output by the PE modulation circuit 12 is input to the phase modulation circuit 3. The phase modulation circuit 3 performs the following phase modulation. When the phase modulation control signal 212 indicates "1", advances the phase of the edge position of the recording channel signal 202. When the phase modulation control signal 212 indicates "0", the phase modulation circuit 3 delays the phase of the edge position of the recording channel signal 202.

The phase-modulated recording channel signal 203 is input to the recording channel 4. The recording channel 4 generates the control signal 204, which is used to change the recording power of a laser beam, in accordance with the modulated recording channel signal 203, and outputs it to the recording head 5. The recording head 5 forms optically readable modulated recording marks (or modulated pits) on the optical disc 6 while increasing or decreasing the laser beam power in accordance with the control signal 204 output by the recording channel 4.

As described above, auxiliary information encrypted based on a pseudo-random number sequence is encoded in the edge portions of the recording marks for main information and can be thus recorded in an information recording medium.

The cycle of phase modulation performed by the phase modulation circuit 3 (i.e., a cycle in which a first state of advancing the phase of the edge position and a second state of delaying the phase of the edge position is switched) will be described below. If the first state of advancing the phase of the edge position or the second state of delaying the phase of the edge position is within the response frequency band of the PLL for generating the reproduction channel clock in reproduction (i.e., a frequency which is the inverse of a cycle of switching the first state and the second state is smaller than or equal to the PLL response frequency), the PLL adversely follows the phase-modulated edge position, so that the auxiliary information recorded by the phase modulation cannot be detected. Note that the PLL response frequency is the inverse of a cycle in which the reproduction channel clock is updated by the PLL.

In this embodiment, the predetermined frequency of the phase modulation control signal 212 is higher than the response frequency of the PLL 45. Thus, the cycle of switching the directions of shifting the edge position of the pit or recording mark for recording auxiliary information is shorter than the cycle of the PLL 45 updating the reproduction channel clock 304. Therefore, the PLL 45 does not follow the phase-modulated edge position.

In a conventional example, the frequency of switching the first state and the second state is higher than the PLL response frequency so that the first and second states are switched on a channel clock-by-channel clock basis. In this case, if bit shift occurs due to dust, scars, fingerprints, or the like on an optical disc in reproduction (e.g., a synchronization signal detected in reproduction is shifted by one clock from a synchronization signal used in recording), the polarity of the phase modulation control signal in recording is opposite to the polarity of the phase modulation control signal in reproduction, so that correct phase difference detection cannot be performed.

Therefore, it is necessary to determine a duration in which the first state or the second state continues, based on the PLL response frequency and the tolerable width of bit shift. In this case, the longer the duration of the first state or the second state, the less the adverse influence of the bit shift, but the shorter the length of the 1-bit pseudo-random number sequence for encoding auxiliary information. In this case, the correlation between the correct pseudo-random number sequence and the incorrect pseudo-random number sequence is increased.

Figure 3:
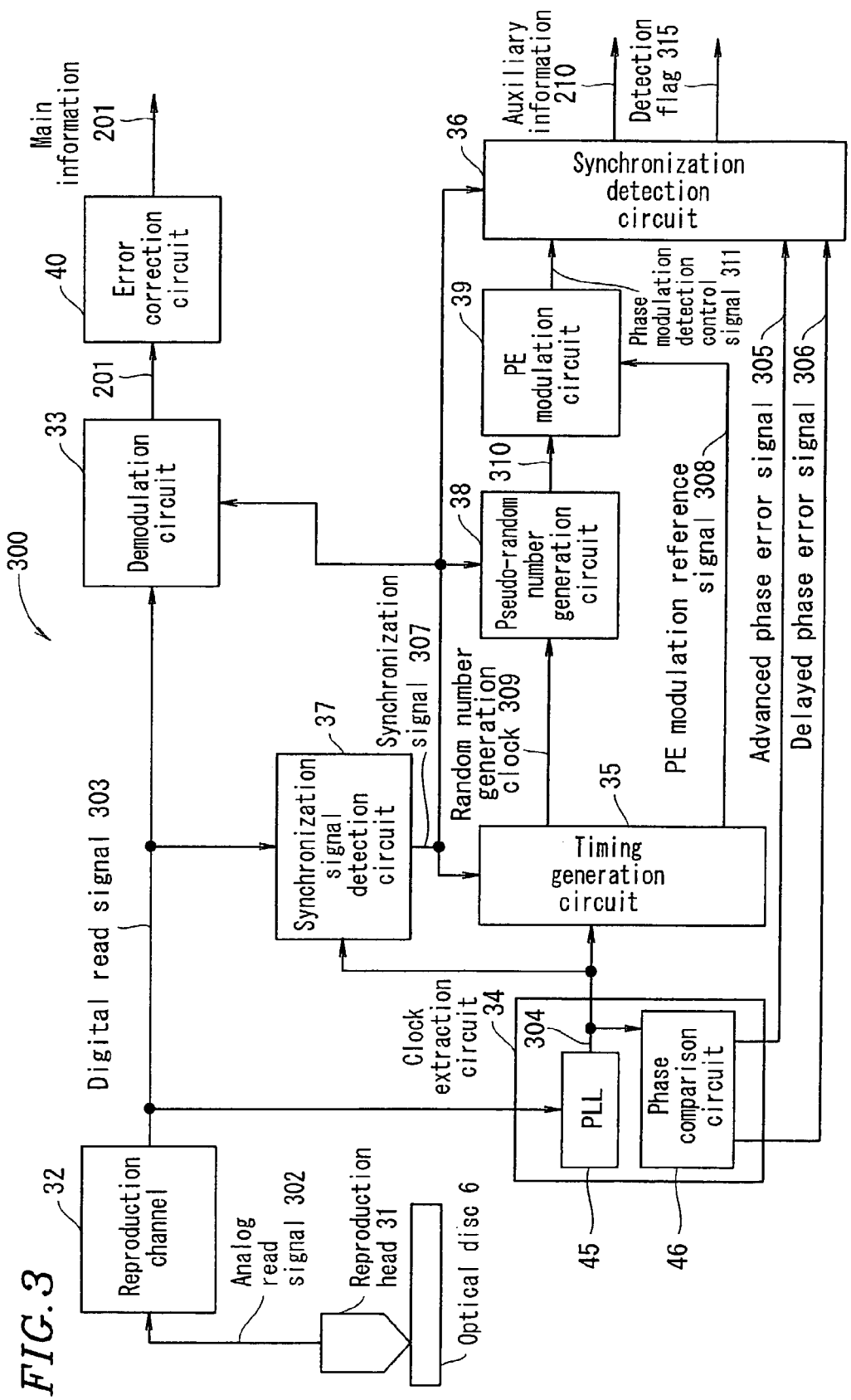
FIG. 3 is a diagram showing an optical disc reproduction apparatus according to an embodiment of the present invention.

Next, a description will be given of an optical disc reproduction apparatus 300 according to an embodiment of the present invention, which reproduces main information 201 and auxiliary information 210 from an optical disc 6 in which the main information 201 and the auxiliary information 210 have been recorded by the optical disc recording apparatus 100. FIG. 3 shows the optical disc reproduction apparatus 300. The optical disc reproduction apparatus 300 has capacity of reproducing the main information 201 and the auxiliary information 210 simultaneously from the optical disc 6. The optical disc reproduction apparatus 300 also has capacity of not only reproducing the main information 201 in accordance with modulated recording marks formed on the optical disc 6 but also detecting auxiliary information which is embedded in the jitter of the modulated recording mark in reproducing the main information 201.

The optical disc reproduction apparatus 300 comprises a reproduction head 31, a reproduction channel 32, a demodulation circuit 33, a clock extraction circuit 34, a timing generation circuit 35, a synchronization detection circuit 36, a synchronization signal detection circuit 37, a pseudo-random number generation circuit 38, a PE modulation circuit 39, and an error correction circuit 40. The clock extraction circuit 34 comprises a PLL 45 and a phase comparison circuit 46. The optical disc 6 is loaded as an information recording medium in the optical disc reproduction apparatus 300.

The reproduction head 31 converges a light beam and irradiates a modulated recording mark 301 (FIG. 5) formed on the rotating optical disc 6 with the light beam, and receives the reflected light using a photodiode. The reproduction head 31 amplifies an output signal of the photodiode which receives the reflected light, and generates an analog read signal 302 which indicates the edge position of the modulated recording mark 301 and outputs it to the reproduction channel 32. The reproduction head 31 functions as a section for reading either pits or recording marks. The reproduction channel 32 performs waveform equalization or shaping of the analog read signal 302 so as to transform it into a digital read signal 303, and outputs it to the clock extraction circuit 34 and the demodulation circuit 33.

The PLL 45 included in the clock extraction circuit 34 generates a reproduction channel clock 304 synchronized with a recording channel bit clock 206 (FIG. 2), based on the digital read signal 303 and outputs it to the timing generation circuit 35. At the same time, the phase comparison circuit 46 included in the clock extraction circuit 34 detects an error in the phase of the digital read signal 303 using the reproduction channel clock 304 as a reference.

The phase comparison circuit 46 compares the phase of the digital read signal 303 with the phase of a reproduction clock. When the phase of the digital read signal 303 is advanced from the phase of the reproduction channel clock 304, the phase comparison circuit 46 generates an advanced phase error signal 305 which indicates that the phase of the digital read signal 303 is advanced. When the phase of the digital read signal 303 is delayed from the phase of the reproduction channel clock 304, the phase comparison circuit 46 generates a delayed phase error signal 306 which indicates that the phase of the digital read signal 303 is delayed. The phase comparison circuit 46 outputs the advanced phase error signal 305 and the delayed phase error signal 306 to a synchronization detection circuit 36 described later.

The demodulation circuit 33 demodulates the digital read signal 303 using a synchronization signal detected by the synchronization signal detection circuit 37 as a reference so as to detect the main information 201. The error correction circuit 40 subjects the detected main information 201 to error correction, and outputs the resulting main information 201.

The synchronization signal detection circuit 37 detects a synchronization pattern included in the digital read signal 303 and generates outputs a synchronization signal 307 to the demodulation circuit 33, the timing generation circuit 35, and the pseudo-random number generation circuit 38.

The timing generation circuit 35 has the same function as that of the timing generation circuit 8 (FIG. 1) in the optical disc recording apparatus 100, and generates a PE modulation reference signal 308 and a random number generation clock 309 using the synchronization signal 307 as a reference.

The pseudo-random number generation circuit 38 has the same function as that of the pseudo-random number generation circuit 9 (FIG. 1) in the optical disc recording apparatus 100, and presets the initial value in accordance with the timing indicated by the synchronization signal 307 and generates a pseudo-random number sequence 310 in accordance with the timing indicated by a random number generation clock output by the timing generation circuit 35.

The logic of the PE modulation reference signal 208 is inverted at the middle of each of a plurality of elements included in the pseudo-random number sequence 310. The frequency of the pseudo-random number sequence 310 (i.e., the frequency of the random number generation clock 309 used as a reference in generating the pseudo-random number sequence 310) and the frequency of the PE modulation reference signal 308 are each lower than ½ of the reference frequency of the recording channel bit clock 206 and is higher than the response frequency of the PLL 45 which generates the reproduction channel clock 304 for reproducing the main information 201.

The PE modulation circuit 39 has the same function as that of the PE modulation circuit 12. (FIG. 1) in the optical disc recording apparatus 100, and PE-modulates the pseudo-random number sequence 310 output by the pseudo-random number generation circuit 38 based on the PE modulation reference signal 308 output by the timing generation circuit 35 to generate a phase modulation detection control signal 311 and output it to the synchronization detection circuit 36. The frequency of the phase modulation detection control signal 311 is substantially consistently lower than ½ of the reference frequency of the recording channel bit clock 206 and is higher than the response frequency of the PLL 45 which generates the reproduction channel clock 304 for reproducing the main information 201.

The synchronization detection circuit 36 detects the auxiliary information 210 from the advanced phase error signal 305 and the delayed phase error signal 306 output by the clock extraction circuit 34 and the phase modulation detection control signal 311 output by the PE modulation circuit 39.

Figure 4:
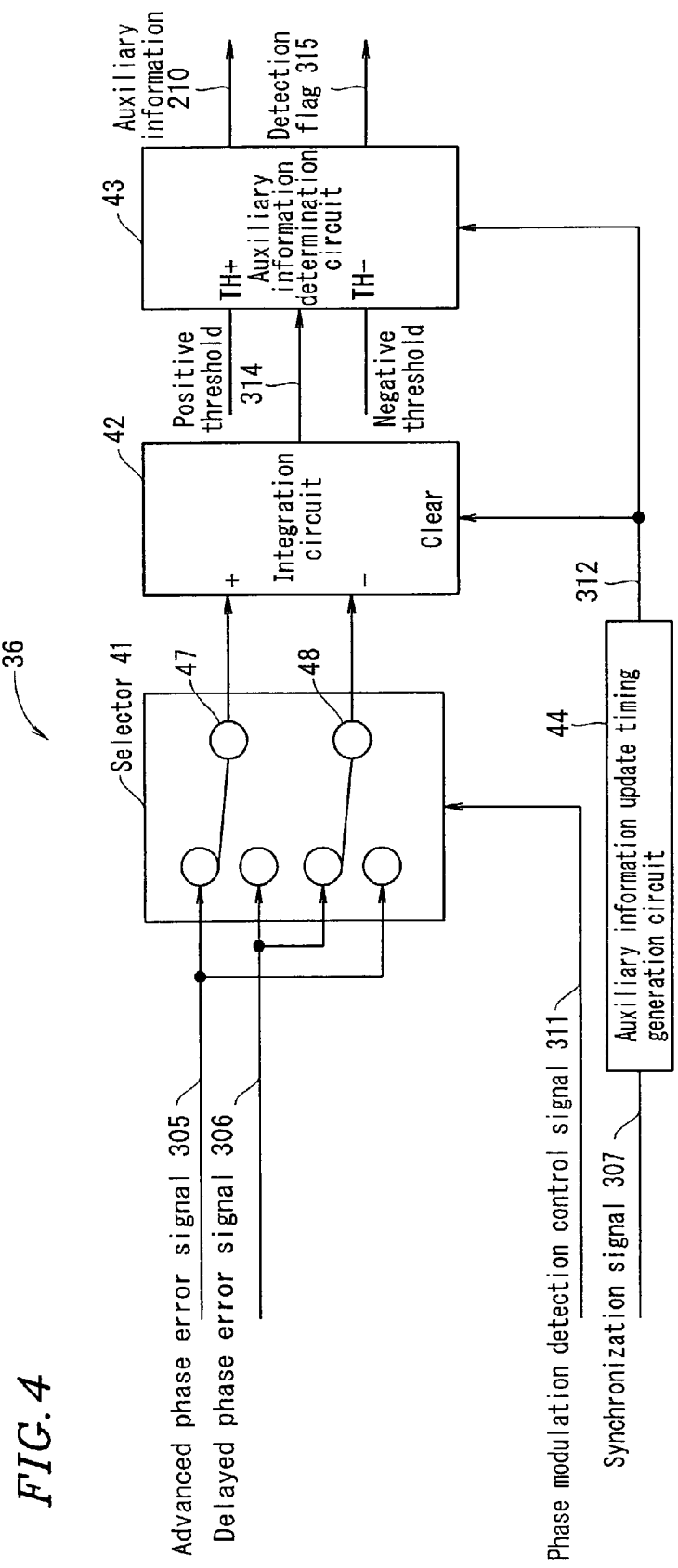
FIG. 4 is a diagram showing a synchronization detection circuit of an optical disc reproduction apparatus according to an embodiment of the present invention.

FIG. 4 shows the synchronization detection circuit 36. The synchronization detection circuit 36 comprises a selector 41, an integration circuit 42, an auxiliary information determination circuit 43, and an auxiliary information update timing generation circuit 44. The selector circuit 41 comprises two 2-input/1-output switches 47, 48. When the phase modulation detection control signal 311 indicates "1", the selector circuit 41 inputs the advanced phase error signal 305 and the delayed phase error signal 306 to a positive input terminal (+) and a negative input terminal (−) of the integration circuit 42, respectively. When the phase modulation detection control signal 311 indicates "0", the selector circuit 41 inputs the advanced phase error signal 305 and the delayed phase error signal 306 to the negative input terminal (−) and the positive input terminal (+) of the integration circuit 42, respectively.

The integration circuit 42 is a differential input analog integration circuit which cumulatively adds signals input through the positive input terminal (+) and cumulatively subtracts signals input through the negative input terminal (−). The auxiliary information update timing generation circuit 44 outputs an update signal 312 to the integration circuit 42 in accordance with the synchronization signal 307. When the integration circuit 42 receives the update signal 312, it clears a value held by the analog integration circuit 42. As a result, when the phase modulation detection control signal 311 indicates "1", the integration circuit 42 cumulatively adds the advanced phase error signal 305 and cumulatively subtracts the delayed phase error signal 306. When the phase modulation detection control signal 311 indicates "0", the integration circuit 42 cumulatively subtracts the advanced phase error signal 305 and cumulatively adds the delayed phase error signal 306. The integration circuit 42 outputs a voltage corresponding to an integral value 313 (FIG. 5).

Therefore, when positive correlation continues, i.e., pulses appear only in the advanced phase error signal 305 in a period in which the phase modulation detection control signal 311 indicates "1" while pulses appear only in the delayed phase error signal 306 in a period in which the phase modulation detection control signal 311 indicates "0", the integral value 313 is monotonically increased in a positive direction. Conversely, when negative correlation continues, i.e., pulses appear only in the delayed phase error signal 306 in a period in which the phase modulation detection control signal 311 indicates "1" while pulses appear only in the advanced phase error signal 305 in a period in which the phase modulation detection control signal 311 indicates "0", the integral value 313 is monotonically decreased in a negative direction.

When there is neither positive nor negative correlation (i.e., pulses appear randomly both in the advanced phase error signal 305 and the delayed phase error signal 306 without depending the phase modulation detection control signal 311), the advanced phase error signal 305 and the delayed phase error signal 306 have almost the same incidence. As a result, the output voltage of the integration circuit 42 is at a substantially zero level.

The auxiliary information determination circuit 43 comprises a comparator or the like (not shown), and determines which of three voltage sections defined by a predetermined positive threshold and a predetermined negative threshold the voltage value of the analog signal 314 indicating the integral value 313 output by the integration circuit 42 belongs to. The auxiliary information determination circuit 43 outputs the auxiliary information 210 indicating "1" and a detection flag 315 indicating "1" when the voltage value of the analog signal 314 is greater than the positive positive threshold at the time of receipt of the update signal 312 output by the auxiliary information update timing generation circuit 44. The detection flag 315 indicating "1" represents that the auxiliary information 210 has been detected. The auxiliary information determination circuit 43 outputs the auxiliary information 210 indicating "0" and the detection flag 315 indicating "1" when the voltage value of the analog signal 314 is smaller than the negative threshold at the time of receipt of the update signal 312 output by the auxiliary information update timing generation circuit 44.

When the voltage value of the analog signal 314 lies between the positive threshold and the negative threshold, the auxiliary information determination circuit 43 outputs the detection flag 315 indicating "0". The detection flag 315 indicating "0" represents that no auxiliary information 210 has been detected.

The auxiliary information update timing generation circuit 44 generates the update signal 312 which indicates the update timing of the auxiliary information detection operation in accordance with the synchronization signal 307. When receiving the update signal 312, the integration circuit 42 clears the integral value 313 and the auxiliary information determination circuit 43 clears the value of the auxiliary information 210 and the result of determination of the presence or absence of the auxiliary information 210.

Next, a reproduction operation of the optical disc reproduction apparatus 300 will be described with reference to FIG. 5 which shows the timing chart of elements in the optical disc reproduction apparatus 300.

The PLL 45 generates the reproduction channel clock 304 based on the digital read signal 303. The rising the phase of the edge of the generated reproduction channel clock 304 is synchronized with the rising edge and the falling edge of the digital read signal 303. The synchronization signal detection circuit 37 samples the digital read signal 303 at the time of the falling edge of the reproduction channel clock 304 and compares the digital read signal 303 with a particular synchronization pattern so as to detect the synchronization pattern in the digital read signal 303. When a synchronization pattern matching the particular synchronization pattern is detected, the synchronization signal detection circuit 37 outputs the synchronization signal 307 indicating the particular pattern.

When receiving the synchronization signal 307, the timing generation circuit 35 outputs the PE modulation reference signal 308 and the random number generation clock 309. The PE modulation reference signal 308 alternates in a cycle of 16 reproduction channel clocks 304. The pseudorandom number generation circuit 38 initializes the pseudorandom number sequence 310 in accordance with the timing indicated by the synchronization signal 307. The pseudorandom number generation circuit 38 outputs the pseudorandom number sequence 310 which is updated at the time of the falling edge of the PE modulation reference signal 308. The PE modulation circuit 39 generates the phase modulation detection control signal 311 in accordance with the result of an exclusive OR operation of the pseudorandom number sequence 310 and the PE modulation reference signal 308. The PE modulation circuit 39 determines whether to assign "1" or "0" to the value of the phase modulation detection control signal 311 in accordance with the result of the exclusive OR operation every 16 channel clocks of the 32 channel clocks.

The phase comparison circuit 46 detects the phase difference between the rising edge of the reproduction channel clock 304 and the rising and falling edges of the digital read signal 303. When the edge of the digital read signal 303 is advanced from the rising edge of the reproduction channel clock 304, the phase comparison circuit 46 outputs the advanced phase error signal 305. When the edge of the digital read signal 303 is delayed from the rising edge of the reproduction channel clock 304, the phase comparison circuit 46 outputs the delayed phase error signal 306.

When the phase modulation detection control signal 311 indicates "1", the synchronization detection circuit 36 adds the advanced phase error signal 305 and subtracts the delayed phase error signal 306. When the phase modulation detection control signal 311 indicates "0", the synchronization detection circuit 36 adds the delayed phase error signal 306 and subtracts the advanced phase error signal 305.

The synchronization detection circuit 36 repeats the above-described addition and subtraction until integration is completed for a predetermined number of bytes. When the voltage value of the analog signal 314 indicating the integral value 313 is greater than the positive threshold, the synchronization detection circuit 36 determines that the value of the auxiliary information 210 is "1" and outputs the auxiliary information 210 indicating "1" and the detection flag 315 indicating "1". When the voltage value of the analog signal 314 is lower than the negative threshold, the synchronization detection circuit 36 determines that the value of the auxiliary information 210 is "0" and outputs the auxiliary information 210 indicating "0" and the detection flag 315 indicating "1". When the voltage value of the analog signal 314 lies between the positive threshold and the negative threshold, the synchronization detection circuit 36 determines that the auxiliary information 210 is not correctly embedded in the main information 201 and outputs the detection flag 315 indicating "0".

Next, a description will be given of the case where in the optical disc reproduction apparatus 300, the reproduction channel clock 304 generated by the PLL and the digital read signal 303 are out of synchronization (i.e., the occurrence of bit shift) due to scars, dust, fingerprints, or the like on the optical disc 6.

In general, detection of a synchronization pattern means not only perfect matching of a read out reproduction signal with a predetermined synchronization pattern, but also substantial perfect matching thereof. In the latter case, when a synchronization pattern substantially close to the predetermined synchronization pattern is detected, the substantially close synchronization pattern may be regarded as a synchronization signal. For example, in the case of DVD, main information is divided into units called frames where each unit corresponds to a plurality of bytes. A plurality of types of synchronization patterns are recorded in the leading portion of respective frames in accordance with the position of the frame. However, the plurality of types of synchronization patterns include a common pattern (e.g., 14T+4T. 14T+4T means an "L" or "H" signal corresponding to 14 clocks followed by an "L" or "H" signal corresponding to 4 clocks). By detecting the common pattern, the common pattern is regarded as a synchronization signal. In this case, for example, when a pattern, such as 14T+3T, 13T+3T, 15T+4T or the like, close to the predetermined pattern 14T+4T is detected as well, these close patterns are regarded as a synchronization signal.

Alternatively, other than the shift of the synchronization pattern, when the digital read signal and the reproduction channel clock are out of synchronization, a bit pattern different from the bit pattern which has been formed in recording is detected. In such a case, a reproduced digital read signal cannot be demodulated, so that correct main information cannot be obtained. Therefore, by performing error correction for erasure correction, correct main information can be reproduced even when all of the frames are wrong.

However, when the timing of detecting the synchronization signal is deviated from the synchronization pattern recorded on a disc or when the reproduction channel clock and the digital read signal are out of synchronization, the timing indicated by the phase modulation control signal in the optical disc recording apparatus is deviated from the timing indicated by the phase modulation detection control signal in the optical disc reproduction apparatus, resulting in incorrect correlation between the phase modulation detection control signal, and the advanced phase error signal and the delayed phase error signal.

Figure 6:
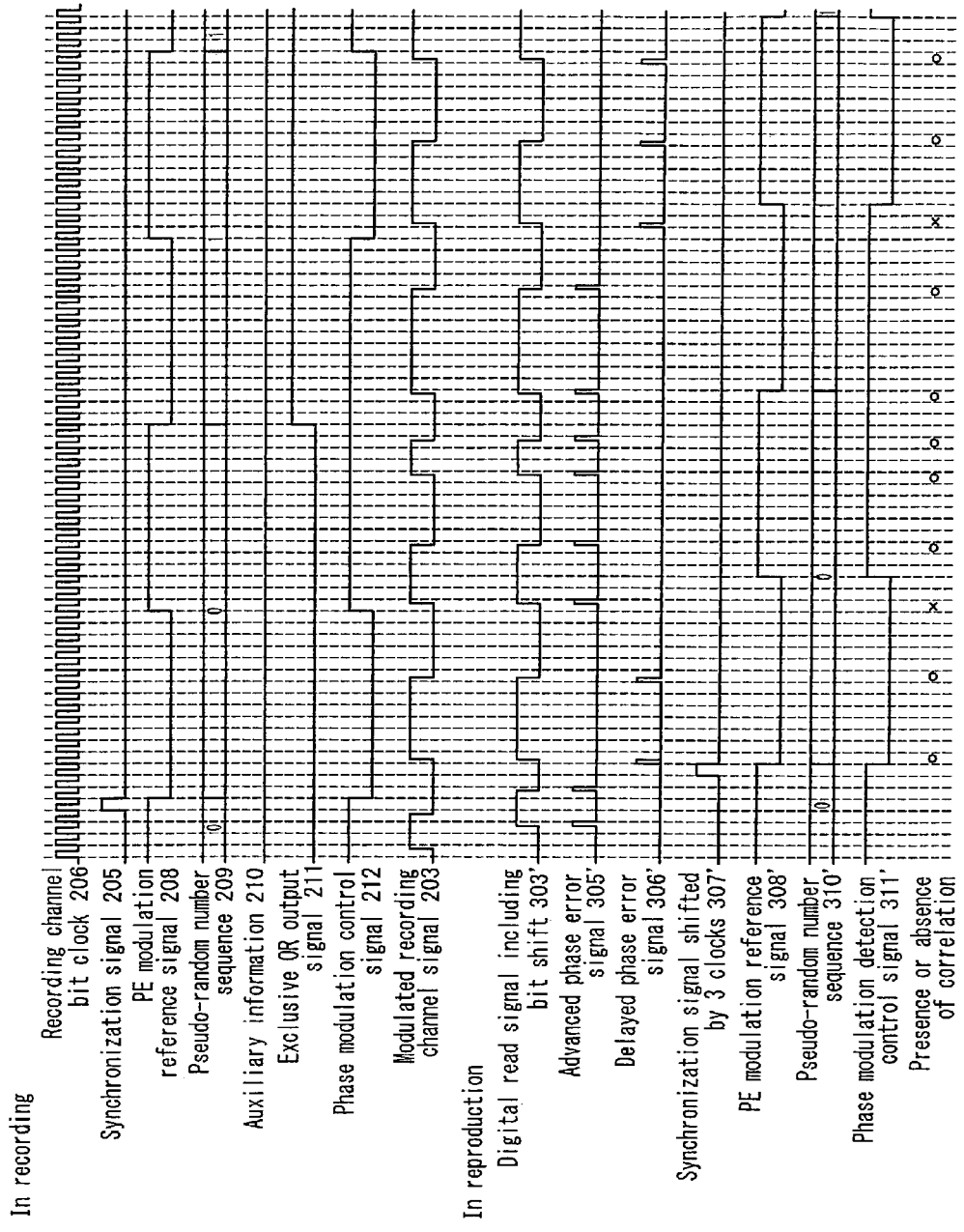
FIG. 6 is a timing chart when bit shift occurs in an optical disc reproduction apparatus according to an embodiment of the present invention.
Figure 7:
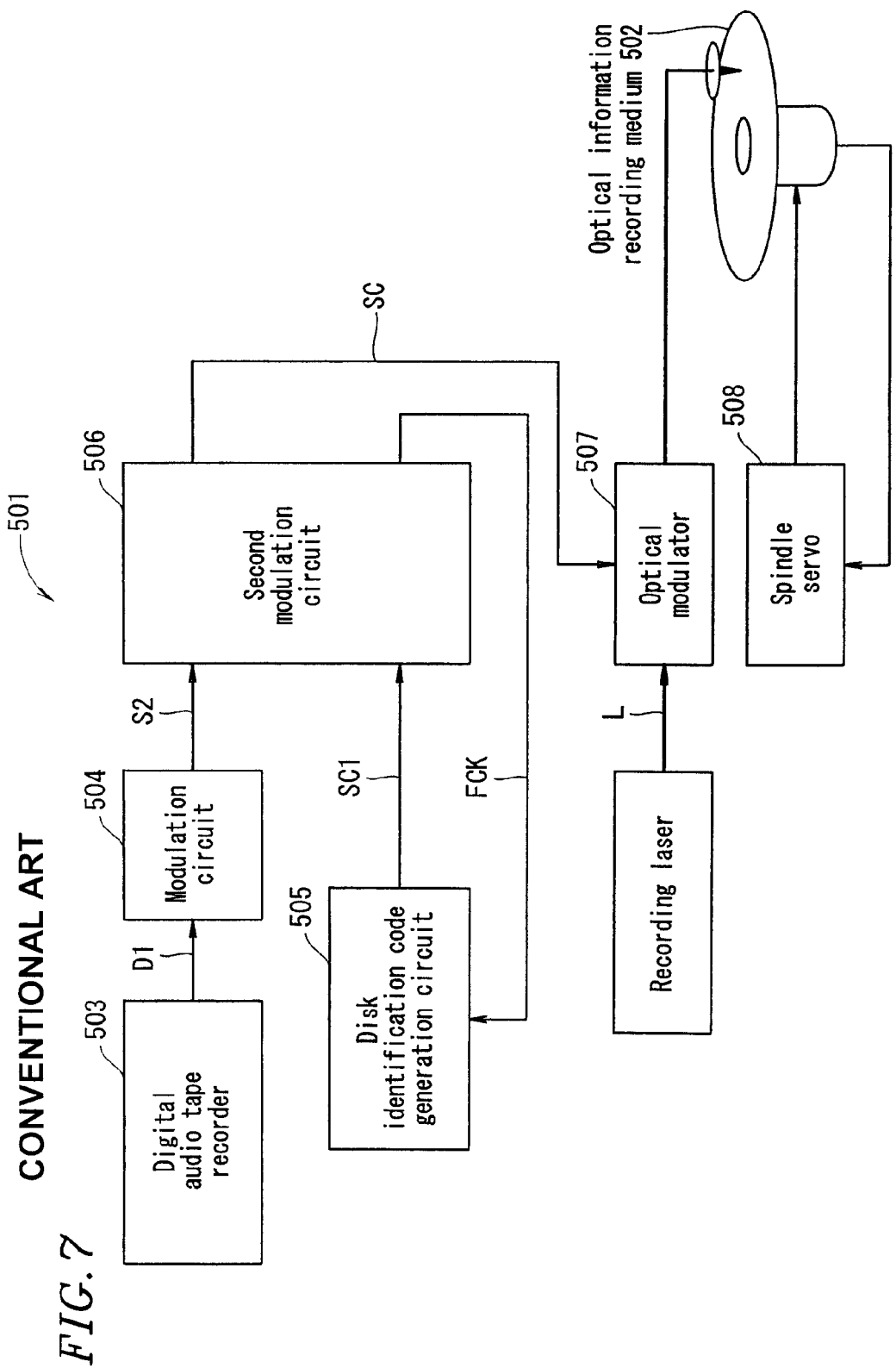
FIG. 7 is a diagram showing a conventional optical disc recording apparatus.
Figure 8:
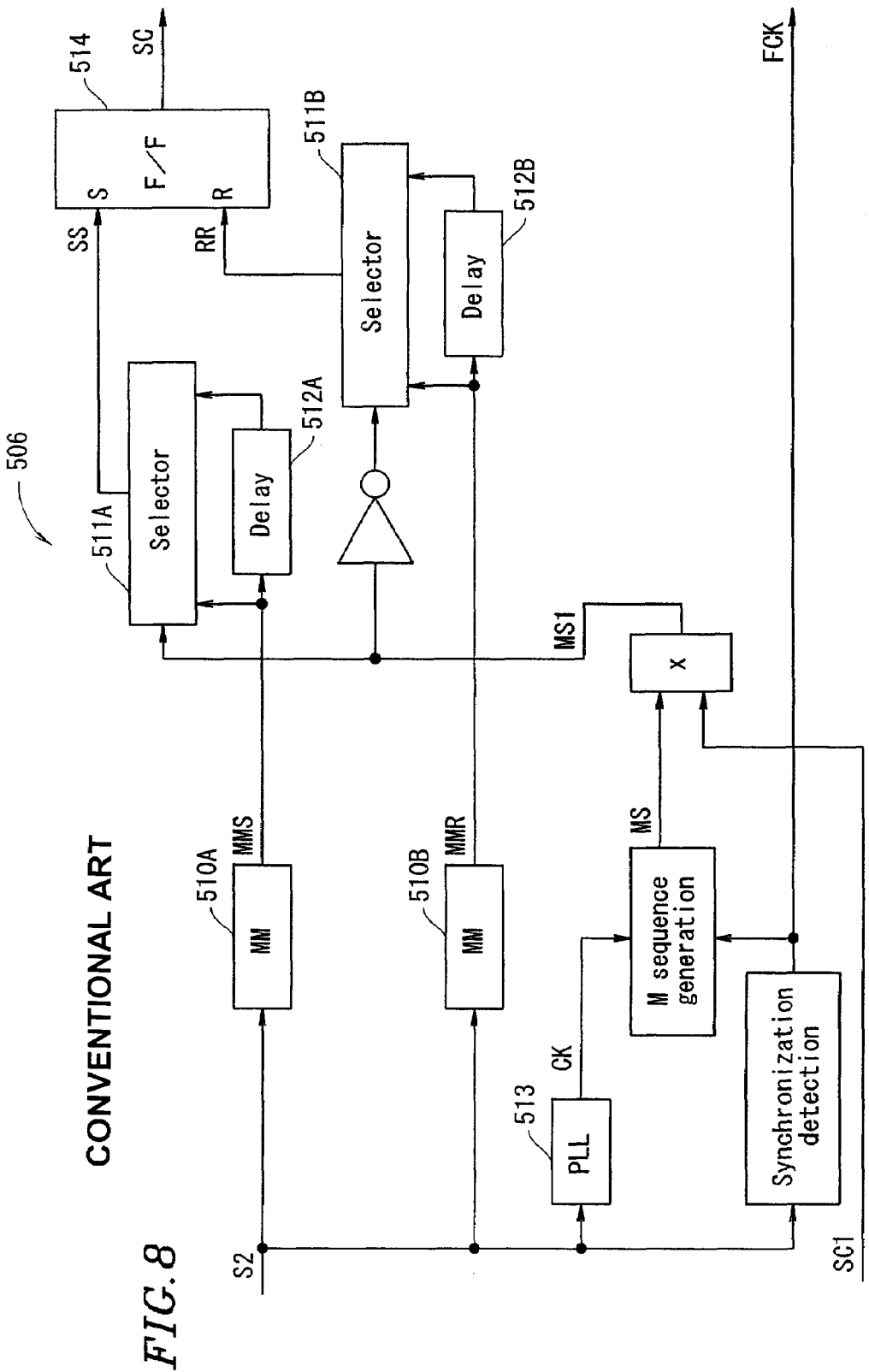
FIG. 8 is a diagram showing a second modulation circuit of a conventional optical disc recording apparatus.
Figure 9:
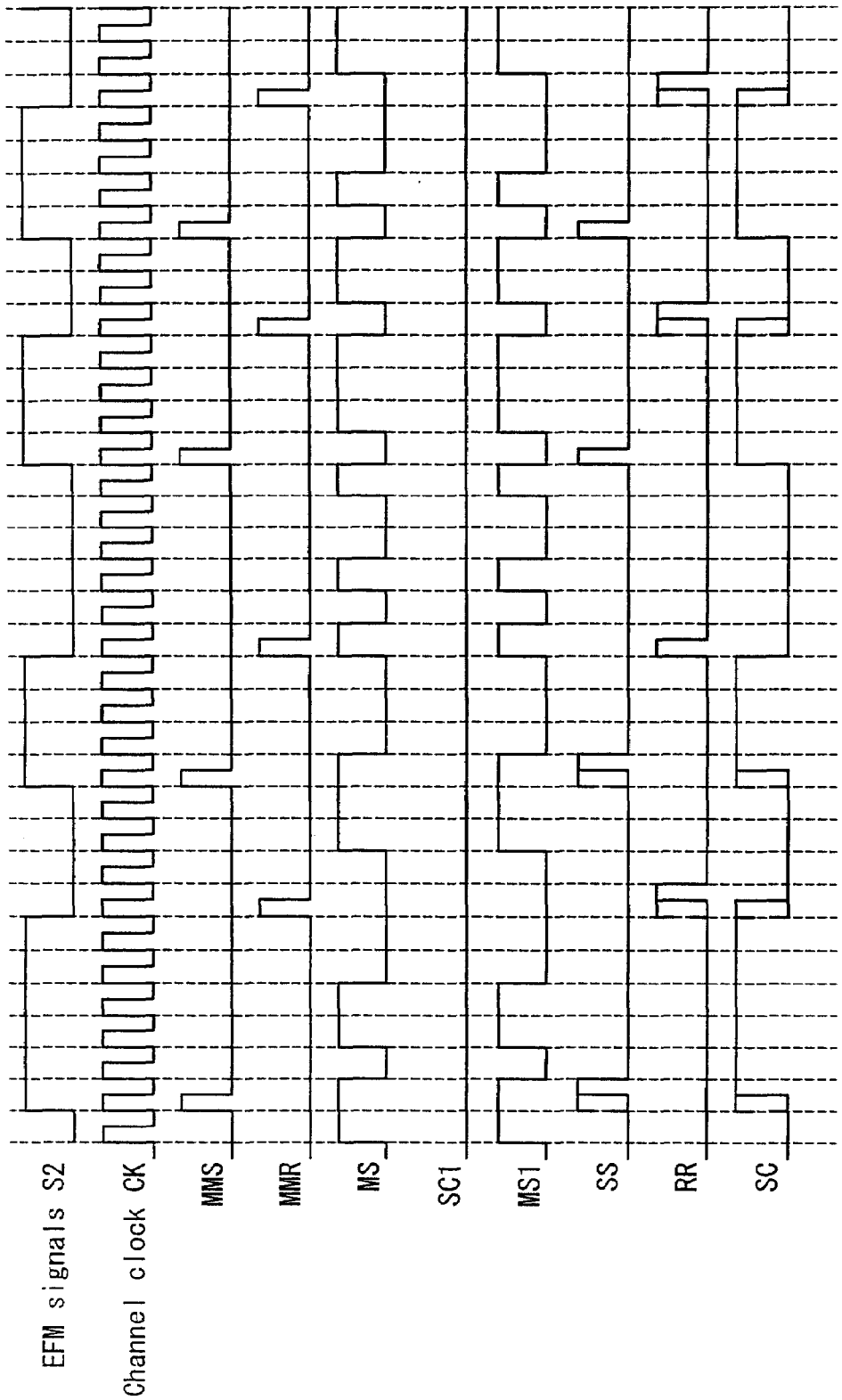
FIG. 9 is a timing chart of operations of a conventional optical disc recording apparatus.

The bit shift will be described in more detail with reference to FIG. 6. FIG. 6 shows that dust, scars, fingerprints, or the like on the disc 6 garbles the bit pattern of a portion of the digital read signal 303 and a digital read signal 303' is obtained, and as a result, the detection of a synchronization pattern is deviated by 3 clocks as compared to when no bit shift occurs.

In the case of recording operations, the recording channel signal 202 (FIG. 2) is output in accordance with the recording channel bit clock 206, the synchronization signal 205 indicating a synchronization pattern is consistently output to the same position with respect to the recording channel signal 202 (i.e., no deviation occurs).

As described above with reference to FIG. 2, the PE modulation reference signal 208 and the pseudo-random number sequence 209 are generated in accordance with the synchronization signal 205. The phase modulation control signal 212 is generated from the exclusive OR output signal 211 indicating the result of an exclusive OR operation of the pseudo-random number sequence 209 and the auxiliary information 210 and the PE modulation reference signal 208. By advancing or delaying the phases of the edges of recording marks in accordance with the phase modulation control signal 212, the auxiliary information 210 is encoded together with the main information 201.

It is now assumed that when the optical disc reproduction apparatus 300 reproduces the main information 201 and the auxiliary information 210 from the optical disc 6 storing the main information 201 and the auxiliary information 210, a synchronization signal 307' deviated by 3 clocks from the synchronization signal 307 is obtained. Since the synchronization signal 307' is used as a reference, the advanced phase error signal 305, the delayed phase error signal 306, the PE modulation reference signal 308, the pseudo-random number sequence 310, and the phase modulation detection control signal 311 are each shifted by 3 clocks, resulting in an advanced phase error signal 305', a delayed phase error signal 306', a PE modulation reference signal 308', a pseudo-random number sequence 310', and a phase modulation detection control signal 311'. As compared to the phase modulation control signal 212 used in recording, the phase modulation detection control signal 311' used in reproduction is delayed by 3 clocks. Referring to FIG. 6, the polarity of the phase modulation control signal 212 is the same as the polarity of the phase modulation detection control signal 311' at edge positions of the digital read signal 303' indicated by open circles. In a period in which these polarities are the same, the correlation between the advanced phase error signal 305' and the delayed phase error signal 306', and the phase modulation detection control signal 311' can be correctly detected. However, the correlation cannot be correctly detected at edge positions indicated by crosses, since the polarity of the phase modulation control signal 212 is different from the polarity of the phase modulation detection control signal 311'.

In a period of the 1-bit pseudo-random number sequence (32 clocks in length), the polarity of the phase modulation control signal 212 matches the polarity of the phase modulation detection control signal 311' over 26 clocks, while the polarity of the phase modulation control signal 212 does not match the polarity of the phase modulation detection control signal 311' over 6 clocks. Correct correlation can be obtained without a probability of ½ over 3 clocks in the mismatching period. Therefore, correct correlation is obtained in the 32 clock period with a probability of 27.5/32.

If phase modulation randomly occurs, the probability that correct correlation is obtained over all clock periods is ½, i.e., the probability that correct correlation is not obtained is ½. In this case, the probability that correct correlation is obtained in the 32 clock period is ½ (=$^{16}/_{32}$). Therefore, even if the detected synchronization signal is deviated by 3 clocks, correct auxiliary information 210 can be obtained.

In contrast, in conventional examples, if the detected synchronization signal is deviated by 3 clocks, the random number sequence in recording is totally different from the random number sequence in reproduction, so that correct correlation is not obtained.

In this embodiment, the predetermined frequency, which is a reference for determining the shift direction of the edge position of a pit or a recording mark, is lower than ½ of the reference frequency of the recording channel bit clock 206. That is, the minimum cycle of each of the phase modulation control signal 212 and the phase modulation detection control signal 311 is greater than 2 clocks.

Now, it is assumed that the phase modulation detection control signal 311 is deviated by 1 clock from the phase modulation control signal 212 and that the minimum cycle of each of the phase modulation control signal 212 and the phase modulation detection control signal 311 is 2 clocks. When 1 cycle is 2 clocks, the probability that correct correlation is obtained is ½. In this embodiment, the minimum cycle of each of the phase modulation control signal 212 and the phase modulation detection control signal 311 is greater than 2 clocks, the probability that correct correlation is obtained is higher than ½, so that correct auxiliary information 210 can be obtained. Therefore, in this embodiment, even if the phase modulation control signal 212 is deviated by 1 clock from the phase modulation detection control signal 311, correct auxiliary information 210 can be consistently obtained.

As described above, in the optical disc recording apparatus and optical disc reproduction apparatus of the present invention, the generation cycle of a pseudo-random number sequence for encrypting auxiliary information is elongated. Therefore, even when bit shift occurs between the pseudo-random number sequence used in an optical disc recording apparatus and the pseudo-random number sequence used in an optical disc reproduction apparatus due to scars, dust, fingerprints, or the like on an optical disc, the probability that the correlation between the phase modulation detection control signal and the advanced phase error signal and delayed phase error signal can be correctly detected can be higher than ½. Thus, auxiliary information can be correctly detected.

Some embodiments of an optical disc having jitter modulation according to the present invention, and an optical disc recording apparatus and an optical disc reproduction apparatus employing this optical disc have been heretofore described. The present invention is not limited to the above-described embodiments. The present invention can be implemented by a recording method and a reproduction method comprising steps of performing the operations of characteristic components of the optical disc recording apparatus and the optical disc reproduction apparatus.

According to the present invention, a predetermined frequency is used to determine whether the phase of the position of one edge of a pit or a recording mark is shifted in a phase advancing direction or in a phase delaying direction in order to record auxiliary information. This predetermined frequency is substantially consistently lower than ½ of the reference frequency of a recording clock for creating pits or recording marks and is higher than the response frequency of a PLL which generates a reproduction clock for reproducing main information. Therefore, even when bit shift occurs in a synchronization operation in reproduction due to scars, dust, fingerprints, or the like on an information recording medium, the difference between a phase modulation control signal for determining the direction of phase shift in recording and a phase modulation detection control signal for determining the direction of a phase shift in reproduction can be reduced, thereby making it possible to correctly detect auxiliary information.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording medium for recording main information and auxiliary information, wherein:

the information recording medium comprises a track;

the main information is recorded on the information recording medium in a manner that pits or recording marks indicating the main information are provided on the information recording medium in a track direction;

the auxiliary information is recorded on the information recording medium in a manner that edge positions of the pits or the recording marks are shifted either in a phase advancing direction or in a phase delaying direction along the track direction;

a predetermined frequency is used to determine whether the edge position is shifted in the phase advancing direction or in the phase delaying direction in order to record the auxiliary information;

the predetermined frequency is substantially consistently lower than ½ of a reference frequency of a recording clock for creating the pits or the recording marks and is higher than a response frequency of a PLL for generating a reproduction clock for reproducing the main information;

the predetermined frequency is determined based on a result of a first logic operation of a predetermined binary sequence and the auxiliary information; and the frequency of the predetermined binary sequence is lower than ½ of the reference frequency of the recording clock and is higher than the response frequency of the PLL.

2. An information recording medium according to claim 1, wherein:

the predetermined binary sequence is a pseudo-random number sequence comprising a plurality of elements;

the predetermined frequency is determined based on a result of a second logic operation of a PE modulated signal and the result of the first logic operation, the PE modulated signal being logically inverted at the middle of each of the plurality of elements; and the frequency of the PE modulated signal is lower than ½ of the reference frequency of the recording clock and is higher than the response frequency of the PLL.

3. A recording apparatus for recording main information and auxiliary information onto an information recording medium having a track, comprising:

a recording signal generation section for generating a recording signal indicating the main information synchronized with a recording clock;

a phase modulation section for modulating an edge position of the recording signal either in a phase advancing direction of the recording signal or in a phase delaying direction of the recording signal to generate a phase modulation recording signal indicating the main information and the auxiliary information; and a recording section for creating pits or recording marks indicating the main information onto the information recording medium in a manner that edge positions of the pits or the recording marks are shifted either in a phase advancing direction or in a phase delaying direction along a track direction based on the phase modulation recording signal, whereby the main information and the auxiliary information are recorded on the information recording medium, wherein the phase modulation section uses a predetermined frequency to determine whether the edge position of the recording signal is shifted in the phase advancing direction of the recording signal or in the phase delaying direction of the recording signal; and the predetermined frequency is substantially consistently lower than ½ of a reference frequency of a recording clock for creating the pits or the recording marks and is higher than a response frequency of a PLL for generating a reproduction clock for reproducing the main information, and the recording apparatus further comprising:

a binary sequence generation section for generating a predetermined binary sequence;

an auxiliary information output section for outputting the auxiliary information; and a logic operation section for performing a first logic operation of the predetermined binary sequence and the auxiliary information, and based on a result of the first logic operation, producing a control signal indicating the predetermined frequency, wherein the phase modulation section uses the predetermined frequency indicated by the control signal to determine whether the edge position of the recording signal is modulated in the phase advancing direction of the recording signal or in the phase delaying direction of the recording signal; and the frequency of the predetermined binary sequence is lower than ½ of the reference frequency of the recording clock and is higher than the response frequency of the PLL.

4. A recording apparatus according to claim 3, wherein:

the predetermined binary sequence is a pseudo-random number sequence comprising a plurality of elements;

the recording apparatus further comprises a PE modulation signal generation section for generating a PE modulated signal logically inverted at the middle of each of the plurality of elements;

the logic operation section performs a second logical operation of the PE modulation signal and the result of the first logical operation, and based on a result of the second logical operation, produces the control signal;

the frequency of the PE modulated signal is lower than ½ of the reference frequency of the recording clock and is higher than the response frequency of the PLL.

5. A reproduction apparatus for reproducing main information and auxiliary information recorded on an information recording medium, wherein:

the information recording medium comprises a track;

the main information is recorded on the information recording medium in a manner that pits or recording marks indicating the main information are provided on the information recording medium in a track direction;

the auxiliary information is recorded on the information recording medium in a manner that edge positions of the pits or the recording marks are shifted either in a phase advancing direction or in a phase delaying direction along the track direction;

the reproduction apparatus comprises:

a read section for reading the pits or the recording marks and producing a read signal;

a PLL for generating a reproduction clock synchronized with the read signal;

a phase comparison section for comparing the phase of the read signal with the phase of the reproduction clock and producing an advanced phase signal indicating the advance of the phase of the read signal when the phase of the read signal is advanced from the phase of the reproduction clock or a delayed phase signal indicating the delay of the phase of the read signal when the phase of the read signal is delayed from the phase of the reproduction clock;

an auxiliary information detection section for integrating the advanced phase signal and the delayed phase signal in accordance with a predetermined frequency, and based on a result of the integration, detecting the auxiliary information; and a demodulation section for demodulating the read signal so as to detect the main information, wherein the predetermined frequency is substantially consistently lower than ½ of a reference frequency of a recording clock for creating the pits or the recording marks and is higher than the response frequency of the PLL, and the auxiliary information detection section detects the presence or absence of the auxiliary information by comparing a result of the integration with a predetermined positive threshold and a predetermined negative threshold.

6. A reproduction apparatus according to claim 5, wherein the auxiliary information detection section detects a value of the auxiliary information by comparing a result of the integration with a predetermined positive threshold and a predetermined negative threshold.

7. A reproduction apparatus according to claim 5, further comprising:

a pseudo-random number sequence generation section for generating a pseudo-random number sequence comprising a plurality of elements;

a PE modulated signal generation section for generating a PE modulated signal logically inverted at the middle of each of the plurality of element; and a logic operation section for performing a logic operation of the pseudo-random number sequence and the PE modulated signal, and based on a result of the logic operation, producing a control signal indicating the predetermined frequency, wherein the auxiliary information detection section integrates the advanced phase signal and the delayed phase signal in accordance with the predetermined frequency indicated by the control signal; and the frequency of the pseudo-random number sequence and the frequency of the PE modulated signal are lower than ½ of the reference frequency of the recording clock and are higher than the response frequency of the PLL.

* * * * *

UNITED STATES PATENT AND TRADEMARK OFFICE
CERTIFICATE OF CORRECTION

| | |
|---|---|
| PATENT NO. | : 7,136,335 B2 |
| APPLICATION NO. | : 10/408746 |
| DATED | : November 14, 2006 |
| INVENTOR(S) | : Takashi Yumiba, Masaru Yamaoka and Takahiro Nagai |

Page 1 of 1

It is certified that error appears in the above-identified patent and that said Letters Patent is hereby corrected as shown below:

Title Page, Item (56), under "FOREIGN PATENT DOCUMENTS"
"JP 11-126426   11/1999" should read -- JP 11-126426   5/1999 --; and Claim 7, Column 20, line 42, "plurality of element" should read -- plurality of elements, --.

Signed and Sealed this

Sixth Day of March, 2007

JON W. DUDAS
*Director of the United States Patent and Trademark Office*